US012747414B2

(12) United States Patent
Abreu Uehara et al.

(10) Patent No.: US 12,747,414 B2
(45) Date of Patent: Sep. 29, 2026

(54) TANK CLEANSING OF AUXINIC HERBICIDES COMPRISING AN ACTIVATED CHARCOAL/BENTONITE MIXTURE

(71) Applicant: ICL AMERICA DO SUL S.A., São Paulo (BR)

(72) Inventors: Gabriel Abreu Uehara, Indaiatuba (BR); Veronica Dovis, Limeira (BR); Bruno Orui Saito, Paulínia (BR); Michel Castellani, Piracicaba (BR); Simone Ungari Azzolino Redondo, Campinas (BR)

(73) Assignee: ICL AMERICA DO SUL S.A., São Paulo (BR)

( * ) Notice: Subject to any disclaimer, the term of this patent is extended or adjusted under 35 U.S.C. 154(b) by 387 days.

(21) Appl. No.: 18/280,371

(22) PCT Filed: Mar. 4, 2022

(86) PCT No.: PCT/BR2022/050071
§ 371 (c)(1),
(2) Date: Sep. 5, 2023

(87) PCT Pub. No.: WO2022/183268
PCT Pub. Date: Sep. 9, 2022

(65) Prior Publication Data
US 2025/0277168 A1 Sep. 4, 2025

Related U.S. Application Data

(60) Provisional application No. 63/157,064, filed on Mar. 5, 2021.

(51) Int. Cl.

| | |
|---|---|
| ***C01B 32/30*** | (2017.01) |
| ***C11D 1/02*** | (2006.01) |
| ***C11D 1/37*** | (2006.01) |
| ***C11D 3/12*** | (2006.01) |
| ***C11D 17/00*** | (2006.01) |
| ***C11D 17/04*** | (2006.01) |

(52) U.S. Cl.
CPC .............. *C11D 3/1266* (2013.01); *C11D 3/12* (2013.01); *C11D 17/0013* (2013.01); *C11D 17/044* (2013.01)

(58) Field of Classification Search
CPC .... C11D 1/83; C11D 1/22; C11D 1/29; C11D 1/12; C11D 1/75; C11D 3/1253; C11D 2111/44; C11D 2111/20
See application file for complete search history.

(56) References Cited

U.S. PATENT DOCUMENTS

| | | | | |
|---|---|---|---|---|
| 4,585,753 A * | 4/1986 | Scott | C09K 3/32 47/9 |
| 5,232,484 A * | 8/1993 | Pignatello | A62D 3/17 588/407 |
| 2002/0100893 A1* | 8/2002 | Shultz | D06M 11/74 252/8.61 |

FOREIGN PATENT DOCUMENTS

CN 107473282 A 12/2017

OTHER PUBLICATIONS

Njoku Vo et al., "Adsorption of 2,4-dichlorophenoxyacetic acid by mesoporous activated carbon prepared from H3PO4-activated langsat empty fruit bunch." J Environ Manage. May 1, 2015;154:138-44. doi: 10.1016/j.jenvman.2015.02.002. Epub Feb. 24, 2015. PMID: 25721981.

* cited by examiner

*Primary Examiner* — Charles I Boyer
(74) *Attorney, Agent, or Firm* — GrowIP Law Group LLC

(57) ABSTRACT

Described herein are cleaning compositions and methods with the capacity for adsorption of auxinic herbicides, and particularly auxinic herbicide residues. The compositions generally comprise powdered activated carbon and/or bentonite, which may be provided as a dry powder or suspended in a liquid. The compositions and methods can be used to neutralize the effects of the herbicides and/or remove herbicide residues from an agricultural vessel or tank, thereby allowing the vessel or tank to be reused and reducing the risks of toxicity to off-target plants or non-resistant crops.

5 Claims, 5 Drawing Sheets

(a)

(b)

(a) (b)

(a) (b)

A) Control plant

B) Dicamba 2 ppm concentration

Figure 1:
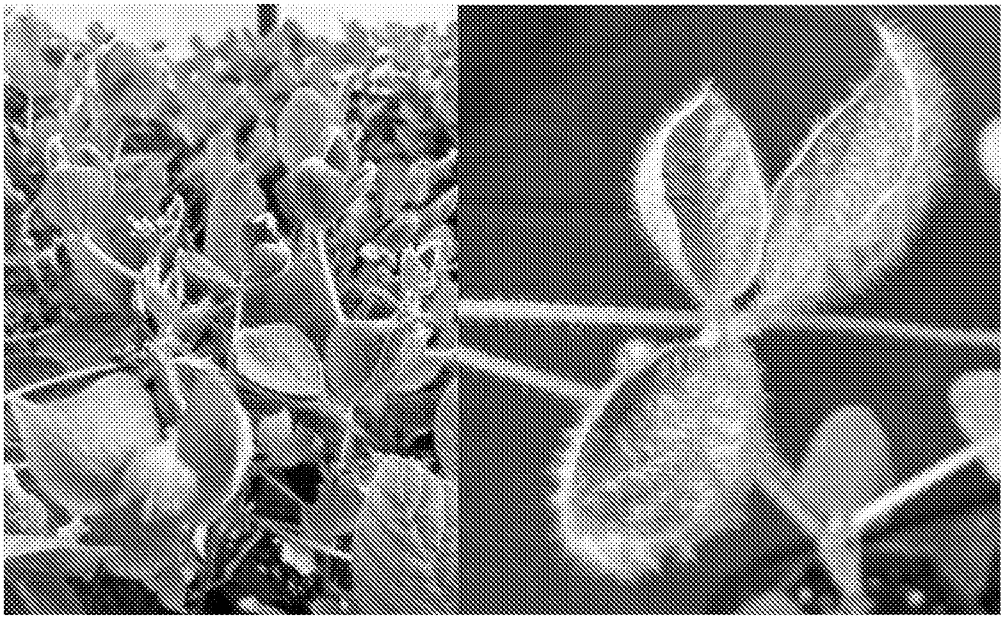
Figure 1:
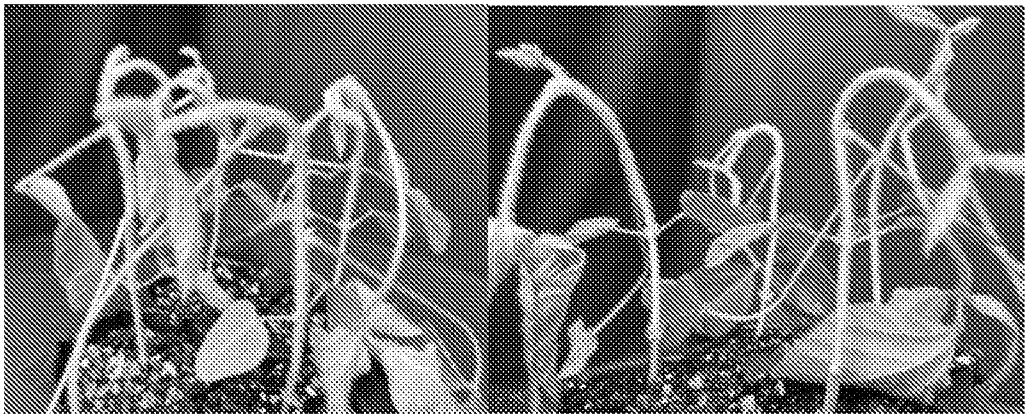

C) Dicamba 2 ppm concentration + concentrated suspension

TANK CLEANSING OF AUXINIC HERBICIDES COMPRISING AN ACTIVATED CHARCOAL/BENTONITE MIXTURE

BACKGROUND

Field

The present disclosure relates to compositions and methods for removing auxinic herbicides from an agricultural vessel. Particularly, after the auxinic herbicides have been applied to control undesirable weeds, the compositions and methods are used to clean the agricultural vessel for subsequent use.

Description of Related Art

In recent years, glyphosate-resistant weeds have forced producers to use plant growth regulating (PGR) herbicides, such as the auxinic mimics dicamba and 2,4-dichlorophenoxyacetic acid (2,4-D), in order to obtain control of undesirable weeds. Unlike glyphosate, which is very water-soluble and can be easily cleaned out of a sprayer with water, dicamba and 2,4-D require more time, care, and caution, since significantly small residues of these auxinic herbicides can cause much more injury to off-target and sensitive crops, such as soybeans, cotton, and cucumber. Moreover, the introduction of dicamba and 2,4-D-resistant soybean cultivars (Intacta2 Xtend and Enlist, respectively) will increase the use of auxin herbicides for management of glyphosate-resistant weeds, increasing the risk of unintentional drift within off-target crops. The literature reports that yield loss in off-target crops can reach levels of 80%, or even more, depending upon the amount of dicamba and 2,4-D residues left uncleaned inside the tank and the growth stage of the off-target crop. Therefore, it is evident that proper sprayer and tank cleanout is essential when switching from dicamba and 2,4-D herbicides to subsequent applications, especially if non-tolerant crops are located nearby.

There are some previous methods used to clean dicamba and 2,4-D. A typical example is the use of household ammonia in solution. In the case of 2,4-D, it is believed that ammonia can bind with the herbicide molecule, changing it from a water-insoluble molecule into a water-soluble ammonium salt. The main drawback of this method is that a quick rinse with this chemical will typically not provide complete cleaning. It also requires long contact time (typically overnight) for ammonia to dissolve the herbicides from the inner parts of the mixing tank (i.e., the rubber and plastic surfaces). Moreover, household ammonia is not compatible with other kinds of chemicals, such as chlorine bleach. In combination, these compounds will produce a toxic gas, creating a harmful environment for workers involved in the cleansing operation. Another method for tank cleansing is the use of a solution of hydrogen peroxide ($H_2O_2$) with ferrous iron (typically iron(II) sulfate, $FeSO_4$) as a catalyst that is used to oxidize contaminants or waste waters. This reaction is also known as Fenton's Reaction and can be used to destroy organic compounds (US2019/0367846A1). However, promoting this reaction inside the mixing tank can expose workers to a hazardous environment. Other products are based on a different mechanism of cleaning, which is detergency, rather than adsorption. Generally this kind of product is used in the conventional triple cleaning, comprising two cleaning washes fulfilling the tank with water and add the product, and one last wash with water.

SUMMARY

Embodiments of the present disclosure generally provide cleaning compositions with the capacity for adsorption of auxinic herbicides, discouraging auxinic herbicide residues from remaining in the mixing tank for further application, and reducing the risks of toxicity to off-target plants or non-resistant crops with phenological stages that should not receive these kinds of agrochemicals.

In one embodiment of the present disclosure, there is provided a method of removing an auxinic herbicide residue from a tank. The method comprises introducing a cleaning composition comprising activated carbon and/or bentonite into the tank comprising the auxinic herbicide residue, and after less than about 1 hour, removing the cleaning composition from the tank. At least about 50% by weight of the auxinic herbicide residue is adsorbed to the activated carbon and/or bentonite when the composition is removed from the tank.

In another embodiment, there is provided a method of removing dicamba residue from a tank. The method comprises introducing a cleaning composition comprising activated carbon and/or bentonite into the tank comprising the dicamba residue and removing the cleaning composition from the tank. At least about 50% by weight of the dicamba residue is adsorbed to the activated carbon and/or bentonite when the cleaning composition is removed from the tank.

In another embodiment, there is provided a method of removing 2,4-dichlorophenoxyacetic acid residue from a tank. The method comprises introducing a cleaning composition comprising activated carbon and/or bentonite into the tank comprising the 2,4-dichlorophenoxyacetic acid residue and removing the cleaning composition from the tank. At least about 50% by weight of the 2,4-dichlorophenoxyacetic acid residue is adsorbed to the bentonite when the cleaning composition is removed from the tank.

In another embodiment, there is provided a cleaning composition for use in removing auxinic herbicide residue from a tank. The composition comprises a quantity of activated carbon powder and a quantity of bentonite powder.

In one embodiment of the present disclosure, there is provided a method of removing an auxinic herbicide residue from a tank. The method comprises introducing a cleaning composition, as suspension concentrated, comprising activated carbon and/or bentonite and a mixture of surfactant components into the tank comprising the auxinic herbicide residue, and after less than about 1 hour, removing the cleaning composition from the tank. At least about 50% by weight of the auxinic herbicide residue is adsorbed into the activated carbon and/or bentonite or emulsified by the mixture of surfactant components when the composition is removed from the tank.

In one embodiment of the present disclosure, there is provided a method of removing an auxinic herbicide residue from a tank. The method comprises introducing a solid cleaning composition comprising activated carbon and/or bentonite and a mixture of surfactant components into the tank comprising the auxinic herbicide residue, and after less than about 1 hour, removing the cleaning composition from the tank. At least about 50% by weight of the auxinic herbicide residue is adsorbed into the activated carbon or emulsified by the mixture of surfactant components when the composition is removed from the tank.

DETAILED DESCRIPTION

The present disclosure is concerned with compositions and methods for neutralizing and/or removing auxinic herbicide residue from a tank, thus allowing the tank to be reused for subsequent application of other agricultural compositions, such as fertilizers and other pesticides (including other herbicides) without the negative effects caused by the presence of the auxinic herbicide residues. The methods generally comprise introducing a cleaning composition including activated carbon and/or bentonite and/or surfactants into a tank containing a residual amount of the auxinic herbicide(s). The cleaning compositions including activated carbon and/or bentonite and/or surfactants are generally capable of adsorbing at least a portion of the auxinic herbicide residue, thereby reducing or neutralizing the effects of the herbicide. The adsorption of the auxinic herbicide by the activated carbon and/or bentonite may be due to electrostatic adhesion and/or other adsorption mechanisms. For example, in certain embodiments, the bentonite have an electrically charged (positive) surface, which may be formed by passing the bentonite through a surface treatment process before use. Since the auxinic herbicide active ingredients are typically in the anionic form (negative), the auxinic herbicide will bind (i.e., electrostatically adhere) to the surface of the bentonite. While the activated carbon can also adsorb auxinic herbicides, the adsorption mechanism is generally different than electrostatic adsorption. Rather, the adsorption mechanism for activated carbon is generally due to other surface interactions owing to the small pore structure of the activated carbon.

Advantageously, the cleaning compositions according to embodiments of the present disclosure can adsorb the auxinic herbicide residue with significantly shorter contact times than prior compositions. For example, in certain embodiments, at least about 50% by weight, preferably at least about 60% by weight, more preferably at least about 70% by weight, even more preferably at least about 80% by weight, and most preferably at least about 90% by weight of the residual amount of the auxinic herbicide is adsorbed to the activated carbon and/or bentonite after less than about 1 hour, preferably less than about 30 minutes, more preferably less than about 20 minutes, and most preferably less than about 15 minutes of contact time (i.e., after introducing the cleaning composition into the tank containing the auxinic herbicide residue). Thus, when the cleaning composition is removed from the tank, the adsorbed auxinic herbicide residue is also removed from the tank and has reduced herbicidal effect.

Auxinic herbicide residues that may be adsorbed, adhered, and/or otherwise removed using the compositions and methods in accordance with embodiments of the present disclosure generally comprise auxin chemicals, such as synthetic auxins and auxin transport inhibitors, which are used for controlling the growth of weeds, and particularly broadleaf weeds. Auxinic herbicides act as plant growth regulators, which are absorbed through both roots and foliage and translocate to meristematic tissue of the plants, thereby altering or inhibiting plant root and shoot growth, among other negative effects on the plant. In certain embodiments, the auxinic herbicide residue is selected from the group consisting of aminocyclopyrachlor, aminopyralid, chloramben, 4-chlorophenoxyacetic acid, clopyralid, dicamba, 2,4-dichlorophenoxyacetic acid (2,4-D), 4-(2,4-dichlorophenoxy) butyric acid, dichlorprop, fenoprop, 2-methyl-4-chlorophenoxyacetic acid, 4-(4-chloro-o-tolyloxy) butyric acid, mecoprop, picloram, quinclorac, 2,4,5-trichlorophenoxyacetic acid, triclopyr, and mixtures thereof. In certain embodiments, the auxinic herbicide residue is selected from the group consisting of dicamba, 2,4-D, and mixtures thereof.

After the cleaning composition is introduced to the tank with certain amount of water and the activated carbon and/or bentonite are contacted with the auxinic herbicide residue for sufficient time to achieve the desired adsorption, the cleaning composition can be removed from the tank as a rinsate mixture. In certain embodiments, for example when the tank is a spray tank, the rinsate mixture can be removed by spraying the liquid rinsate mixture through the hose and nozzle unplugged or without filters. Advantageously, since the auxinic herbicide residue is adsorbed to the activated carbon and/or bentonite, the herbicide is effectively neutralized and the rinsate mixture may be easily disposed with reduced health and safety risks. Additionally, in certain embodiments, the rinsate mixture can be applied directly to agricultural crops or other plants, for example with added water and/or fertilizer compositions, with little or no negative effect on the crops or plants. In some embodiments, after the rinsate mixture has been removed from the tank, a final water rinse may be introduced to the tank.

In certain embodiments, methods in accordance with embodiments of the present disclosure may comprise an optional pre-rinse step, in which an amount of water or other liquid is introduced into the tank, mixed with residual contents of the tank, and removed before introduction of the cleaning composition. The pre-rinse step may be used, for example, to remove a portion of the residual contents of the tank, which may include a portion of the auxinic herbicides as well as other solid and liquid components that may be present in the tank. By removing a portion of the auxinic herbicides and/or other chemicals, the amount of activated carbon and/or bentonite that is subsequently introduced to the tank can be reduced and has less interference for adsorbing the target auxinic herbicides. However, in certain embodiments, a pre-rinse step is not required or utilized. Thus, in certain such embodiments, the cleaning composition may be introduced as the first washing step and is capable of adsorbing at least a portion of the auxinic herbicide residue, as described above, and render the available herbicide in the rinsate less effective or ineffective if it comes into contact with plants.

Cleaning compositions in accordance with embodiments of the present disclosure generally comprise activated carbon and/or bentonite in solid powder form, which may be provided as dry powder or dispersed or suspended in a liquid carrier. For example, when the tank comprising auxinic residue comprises sufficient quantity of water or other liquid carrier, the cleaning composition can be introduced into the tank in powder form. However, when insufficient water or other liquid carrier is present in the tank, the powdered activated carbon and/or bentonite can first be added to water or other liquid carrier to form a suspension that is introduced to the tank. Regardless whether a powdered cleaning composition is introduced to water or other liquid carrier contained within the tank or whether the cleaning composition is introduced as a suspension, the cleaning composition is generally introduced so as to provide a concentration of the activated carbon and/or bentonite of about 0.01% to about 10% by weight, preferably about 0.05% to about 5% by weight, more preferably about 0.1% to about 2.5% by weight, and most preferably about 0.15% to about 0.25% by weight, with the total weight of the tank contents after addition of the composition taken as 100% by weight. In certain preferred embodiments, the cleaning composition is introduced so as to provide a concentration of the activated carbon and/or bentonite of greater than about 0.1% by weight or at least about 0.15% by weight, with the total weight of the tank contents after addition of the composition taken as 100% by weight.

In certain embodiments, the cleaning composition comprises a mixture of both activated carbon and bentonite. In certain such embodiments, the cleaning composition comprises a quantity of activated carbon and a quantity of bentonite present at a weight ratio of about 1:10 to about 10:1, preferably about 1:5 to about 5:1, and more preferably about 1:2 to about 2:1 (activated carbon-to-bentonite).

In certain embodiments, the cleaning composition comprises a mixture of both activated carbon and bentonite and a mixture of surfactants. In certain such embodiments, the cleaning composition comprises a quantity of activated carbon and a quantity of bentonite present at a weight ratio of about 1:10 to about 10:1, preferably about 1:5 to about 5:1, and more preferably about 1:2 to about 2:1 (activated carbon-to-bentonite). The surfactant mixture comprises a quantity of water and a mix of surfactant components, where water/surfactant mix weight ratio is about 5:1 preferably about 3:1 to about 3:2, and more preferably about 1:1 to about 2:1.

Activated carbon, also referred to as "active carbon" or "activated charcoal," used in embodiments of the present disclosure generally comprises small pores that provide large surface area for adsorption of the target chemicals and may be derived, for example, from charcoal. In certain embodiments, the activated carbon may comprise pore sizes characterized as micropores (width<2 nm), mesopores (width of 2-50 nm), and/or macropores (width>50 nm). In certain embodiments, the activated carbon is provided as granular activated carbon (GAC) powder having an average particle size of about 0.01 mm to about 5 mm, preferably about 0.05 mm to about 2 mm, more preferably about 0.1 mm to about 1 mm, and most preferably about 0.15 mm to about 0.25 mm, as measured across the largest dimension of the particle.

Bentonite used in accordance with embodiments of the present disclosure generally comprises smectite clays, which includes phyllosilicate clay minerals that have a three-layer crystalline structure, typically a metal-based layer and two silica-based layers. Smectite clays making up at least a portion of the bentonite may be considered a 2:1 clay, which comprises an octahedral sheet sandwiched between two tetrahedral sheets. In certain embodiments, the smectite generally comprises a phyllosilicate group of minerals, such as montmorillonite. In certain embodiments, the bentonites are cationic resins, which are believed to extract the auxinic herbicides in their anionic form due to electrostatic adhesion, as described above, and may have undergone surface treatment before use. The bentonite used in accordance with embodiments of the present disclosure may include the potassium (K), sodium (Na), calcium (Ca), and/or aluminum (Al) forms of bentonite. In certain embodiments, the bentonite is provided as a clay powder having an average particle size of about 0.01 mm to about 5 mm, preferably about 0.05 mm to about 2 mm, more preferably about 0.1 mm to about 1 mm, and most preferably about 0.15 mm to about 0.25 mm, as measured across the largest dimension of the particle.

Furthermore, one or more additives may be optionally included in the cleaning composition. Such additives include, but are not limited to, alkyl sulphates, alkyl EO sulphates, alkylbenzene sulfonates, non-ionic surfactants such as amine-n-oxide, dispersant agents and antifoam agents, wetting agents.

The agricultural vessel or tank containing the auxinic herbicide residue may be any of a number of reusable pesticide carriers used for storing, transporting, and/or applying pesticides to agricultural crops. In certain embodiments, the agricultural vessel is a spray tank, and may include additional components, such as hoses, pumps, and spray nozzles, which may also contain an amount of auxinic herbicide residue after use. Thus, the cleaning composition may be introduced to such spray tanks or systems so as to provide sufficient adsorption of the residues contained in these components as well. The vessel may comprise any of a variety of materials capable of storing pesticides, and specifically herbicide compositions. In certain embodiments, the vessel or tank comprises a material selected from the group consisting of metals (e.g., aluminum, steel, etc.), plastics (e.g., polyethylenes (PET, HDPE), polyvinyl chloride (PVC), polypropylenes, polystyrenes), rubbers (e.g., neoprene, silicone, nitrile, ethylene propylene diene monomer (EPDM), styrene-butadiene, butyl), and combinations thereof.

Advantageously, compositions and methods in accordance with embodiments of the present disclosure do not require long contact time with the herbicides active ingredients to promote the cleaning. As described above, in certain embodiments, contact times as low as 1 hour, 30 minutes, 15 minutes, or even about 1 to about 15 minutes are sufficient to adsorb the auxinic herbicide residues and promote cleaning of the tank, even at relatively low activated carbon and/or bentonite concentrations. Additionally, in certain embodiments of the present disclosure, the cleaning compositions are generally unharmful to users, and the rinsate waters can be disposed easily and safely in a proper area, such as central aisle.

Additional advantages of the various embodiments of the disclosure will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments but is not necessarily included. Thus, the present disclosure encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the disclosure. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "at least about 10" or "greater than about 10" (with no upper bounds) and a claim reciting "no more than about 100" or "less than about 100" (with no lower bounds).

EXAMPLES

The following examples set five compositions and methods in accordance with the disclosure. It is to be understood, however, that these examples are provided by way of illustration and nothing therein should be taken as a limitation upon the overall scope of the disclosure. The examples below generally show that formulations comprising activated carbon and/or bentonite and/or surfactants has the potential to adsorb residues of dicamba and 2,4-dichlorophenoxyacetic acid (2,4-D).

Example 1

First, it is important to establish the effects of auxinic herbicides on model plants. In this study, the focus was soybean plants due to its economic importance, nevertheless tomato plants were also used as model plants. According to the experimental data, a small content of dicamba (about 1 mg/kg) is sufficient to cause what literature calls the "coupling" effect, which is a structural disruption of cytoskeleton. At higher concentrations (about 50 mg/kg), dicamba can cause more severe injuries, such as wilting of the main rod. Both of these symptoms can be seen in FIG. 1. FIG. 1 shows the effects of phytotoxicity of dicamba residues present in rinsate water and sprayed over soybean plants: (a) coupling effect (low content of dicamba) and (b) main rod wilting (high content of dicamba).

Example 2

Figure 2:
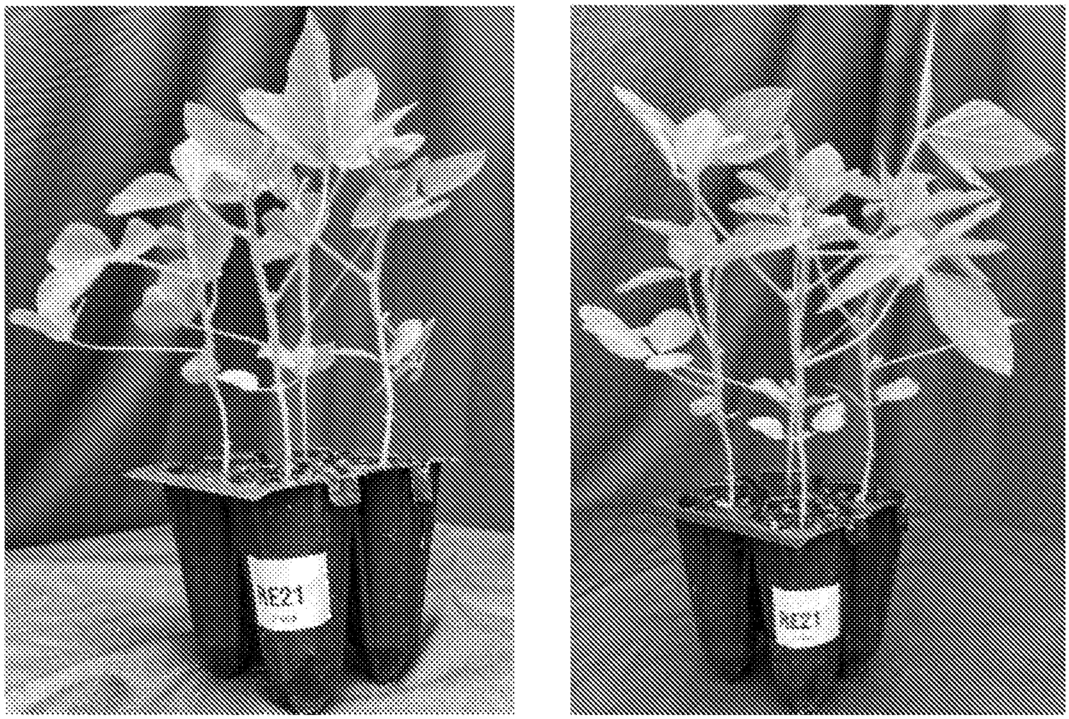

Initial testing of adsorption materials began with activated carbon. Activated carbon is a compound that has small, low-volume pores that increases the surface area available for adsorption. In other words, its small empty spaces act as microsites, which is believed to be able to adsorb dicamba's active ingredient. To check this hypothesis, activated carbon was tested in different ranges of concentration by putting it in contact with dicamba solutions inside plastics flasks made of high-density polyethylene that simulate the inner parts of a mixing tank. After constant mixing for about 15 minutes, the rinsate water was collected, filtered, and sprayed over soybean plants. Then, the soybeans plants were visually compared with those that had suffered injuries (FIG. 1). It was possible to note that small amounts of activated carbon (0.15% w/w) had the capacity to adsorb dicamba molecules in sufficient amount to mitigate the effects of phytotoxicity presented previously. FIG. 2 shows the visual aspects of the soybean plants that have been sprayed after the treatment with activated carbon (0.15%) was performed. Specifically, FIG. 2 shows visual aspects of soybean plants (a) before and (b) after 7 days of application of the rinsate water treated with activated carbon (0.15%).

Example 3

Figure 3:
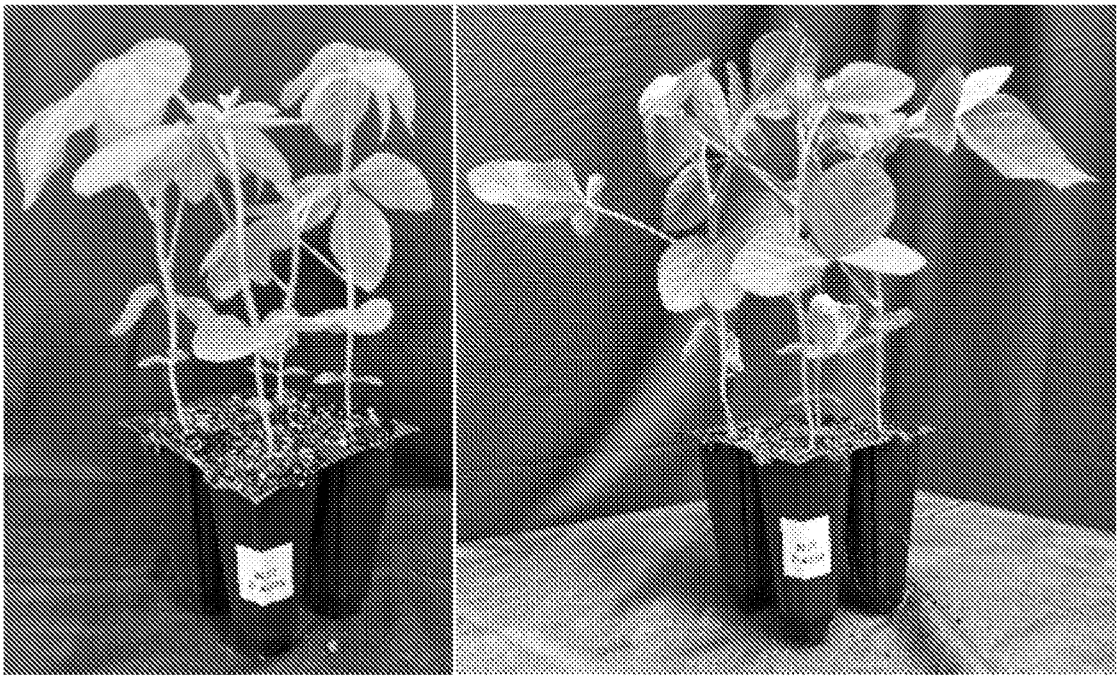

In another experiment a blend was formulated of activated carbon and bentonite at proportion of 50/50 each, and 0.15% w/w of dosage. The mixture of both components provides dual action mechanism (electrostatic and adsorption). The results essentially repeated the previous observations of FIG. 2, and the soybean plants could grow without any apparent injury, as indicated by FIG. 3. Specifically, FIG. 3 shows visual aspects of soybean plants (a) before and (b) after 7 days of application of the rinsate water treated with the blend of activated carbon and bentonite.

Example 4

Figure 4:
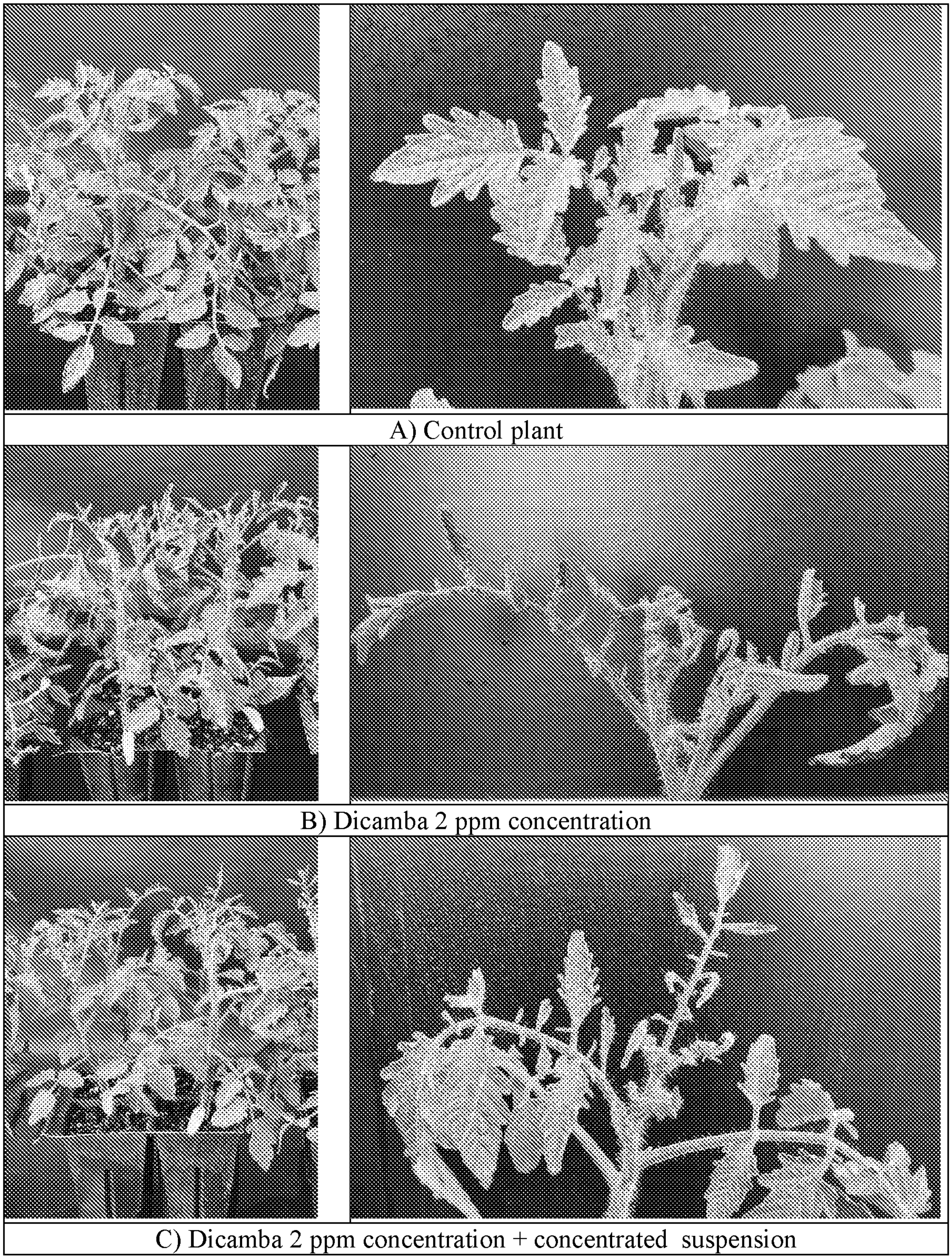

In another example a cleaning formulation in a form of suspension concentrated containing activated carbon and bentonite and a mixture of anionic surfactants was used to prove the Dicamba adsorption capacity by the formulation. A solution of 2 ppm Dicamba concentration was added to PE flasks, in duplicate. To one flask of each concentration was added 0.2% of the concentrated suspension, both flasks were maintained under magnetic mixing for 30 min with the aim of dicamba be adsorb by the suspension. After that, the solutions were sprayed on tomato plants until the runoff point. The plants symptoms were evaluated 15 and 30 days after solutions applied. The results showing that when plants were sprayed with dicamba solutions previously mixing with the formulation the symptoms were unquestionable reduced (FIG. 4). FIG. 4 shows visual aspect of tomato plants: a) control; b) sprayed with 2 ppm Dicamba solution; c) sprayed with 2 ppm Dicamba solution+cleaning formulation–SC

Example 5

Trial 1

A formulation containing activated carbon and a mixture of anionic surfactants was used to prove the Dicamba adsorption capacity by the formulation. Solutions of three different Dicamba concentration—7.5 ppm, 15 ppm and 30 ppm were added to PE flasks, in duplicate. To one flask of each concentration was added 0.2% of the formulation containing activated carbon and a mixture of surfactants, in a solid form. The formulation was hold in contact with the solution for at least 30 min under magnetic mixing. The solutions were than analyzed by HLPC to evaluate the amount of Dicamba residual. The trial was performed in duplicate in two different days, the data presented are the mean values.

| DICAMBA EXPECTED CONCENTRATION (PPM) | DICAMBA W/O FORMULATION (PPM) | DICAMBA W FORMULATION (PPM) | DICAMBA ADSORBED (PPM) | % ADSORPTION |
|---|---|---|---|---|
| 7.5 | 8.2 | 0.93 | 7.27 | 89 |
| 15 | 16.3 | 4.0 | 12.3 | 76 |
| 30 | 32.5 | 8.5 | 24 | 74 |

The formulated product was able to adsorb more than 50% of the Dicamba present in the solution.

Trial 2

In another trial, the formulation describe above was tested to evaluate the adsorption capacity of 2,4-D pesticide. Solutions of three different 2,4-D concentration—7.5 ppm, 15 ppm and 30 ppm were added to PE flasks, in duplicate. To one flask of each concentration was added 0.2% of the formulation. The formulation was hold in contact with the solution for at least 30 min under magnetic mixing. The solutions were than analyzed by HLPC to evaluate the amount of 2,4-D.

| 2,4-D EXPECTED CON-CENTRATION (PPM) | 2,4-D W/O FOR-MULATION (PPM) | 2,4-D W FOR-MULATION (PPM) | 2,4-D ADSORBED (PPM) | % AD-SORP-TION |
|---|---|---|---|---|
| 22.5 | 19.2 | 2.8 | 16.4 | 97 |
| 45 | 37.3 | 4 | 33.3 | 96 |
| 90 | 80 | 13 | 67 | 87 |

Trial 3

Figure 5:
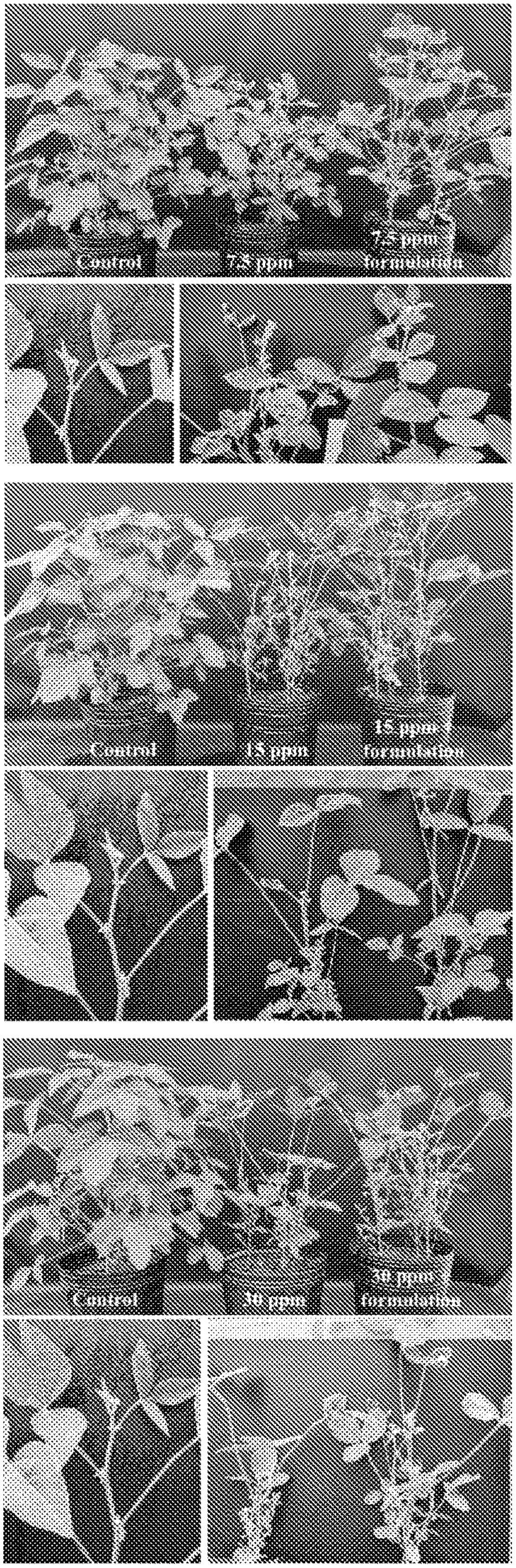

To demonstrate the inactivation of Dicamba by the formulated product, solutions of 3.5 ppm, 7.5 ppm and 15 ppm of dicamba, with and without the formulation, were sprays in soybeans plants, utilizing a spray bar and a $CO_2$ pump. To compare the symptoms of Dicamba, control plants were held without any treatment. FIG. 5 shows pictures taken 21 days after spraying the solution. Specifically, FIG. 5 shows pictures showing symptoms and symptoms reduction in soybean plants when the power formulation was used to shaking by 30 min with dicamba at different concentration.

Figure 6:
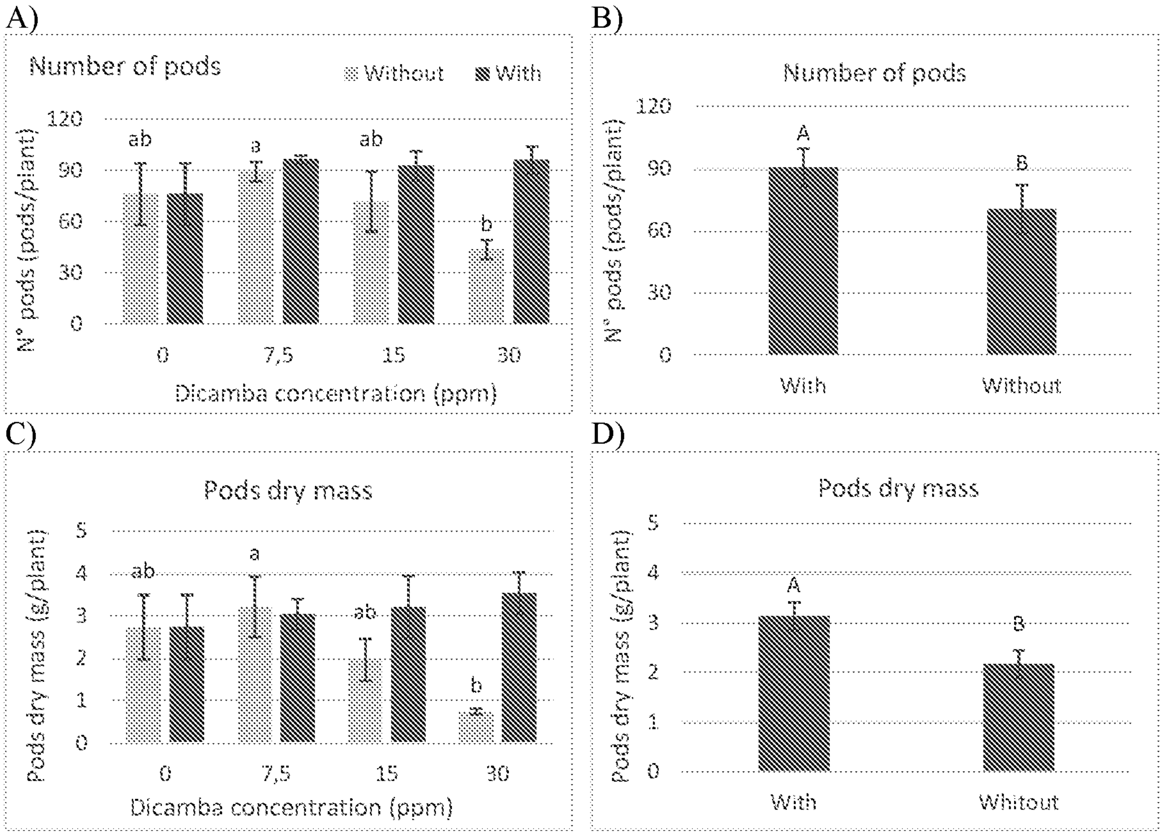

It was possible to notice that the plants presented significant less symptoms in the presence of the formulated product, demonstrating that the percentual of Dicamba adsorbed in the activated carbon was present in an inactive form. FIG. 6 shows the effects on plant biomass and pods of several dicamba concentration, applied with or without power formulation mixing Trial 4

To demonstrate the efficiency of the formulated product, a tank of sprayer equipment that was used with 2,4-D was cleaned following this proposed procedure, and some samples was collected.

An initial pre-rinse step, in which an amount of water is introduced into the tank could be from 10% of nominal tank capacity. A second cleaning step was perform completing the tank with water until full capacity, after mixing a sample was collected at the top of tank. After that was adding the amount of formulated product at 0.2% (w/v) in mass/volume relation to total tank volume capacity. The formulated product was in a hydrosoluble package, to avoid dust formation. The mixture was kept under mixing for 30 min, to hold the contact of the formulated product with 2,4-D pesticide, in a way the adsorption could take place. Samples of all steps of the procedure were analyzed by HPLC.

| Sample | step | 2,4-D (ppm) |
|---|---|---|
| 1 | 2,4-D concentration of field solution | 7950 |
| 2 | Pre-rinse-water solution | 3370 |
| 3 | Complete full tank without formulation | 64.1 |
| 4 | Complete full tank without formulation-after desired contact time | 0.69 |

The invention claimed is:

1. A method of removing an auxinic herbicide residue from a tank, the method comprising:

effectuating a pre rinse cleaning of the tank with water in 5% to 30% of the full tank capacity, and removing this solution from the tank;

introducing a cleaning composition comprising activated carbon, bentonite and a mixture of surfactants at a concentration of about 0.01% to about 10% by weight and water into the tank comprising the auxinic herbicide residue, with full tank capacity completed with water; and after less than about 1 hour, removing the cleaning composition from the tank with another rinse with water in 5% to 30% of the full tank capacity.

2. The method of claim 1, wherein the cleaning composition comprises the activated carbon, bentonite and the mixture of surfactants suspended in a liquid carrier, in a form of concentrated suspension and/or paste.

3. The method of claim 1, wherein the cleaning composition comprises the activated carbon, bentonite and the mixture of surfactants in a solid form, wherein the solid form comprises a powder mixture and/or pastille and/or granules.

4. The method of claim 3, wherein the powder mixture is package using a hydrosoluble plastic film to avoid dust formation and direct contact with the end-user.

5. The method of claim 1, wherein the cleaning composition comprises the activated carbon, bentonite and the mixture of surfactants, suspended in a water or in a solid form.

* * * * *